(12) United States Patent
Sashida (10) Patent No.: US 10,692,209 B2
(45) Date of Patent: Jun. 23, 2020

(54) IMAGE PROCESSING APPARATUS, IMAGE PROCESSING METHOD, AND COMPUTER-READABLE NON-TRANSITORY RECORDING MEDIUM STORING IMAGE PROCESSING PROGRAM

(71) Applicant: KONICA MINOLTA, INC., Chiyoda-ku, Tokyo (JP)

(72) Inventor: Takehiko Sashida, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 148 days.

(21) Appl. No.: 15/944,211

(22) Filed: Apr. 3, 2018

(65) Prior Publication Data
US 2018/0286040 A1 Oct. 4, 2018

(30) Foreign Application Priority Data

Apr. 4, 2017 (JP) ................................. 2017-074642

(51) Int. Cl.
| | |
|---|---|
| *G06K 9/00* | (2006.01) |
| *G01N 21/64* | (2006.01) |
| *G06T 7/00* | (2017.01) |
| *G06N 5/04* | (2006.01) |
| *G06T 7/11* | (2017.01) |

(Continued)

(52) U.S. Cl.
CPC ........ *G06T 7/0012* (2013.01); *G06K 9/00147* (2013.01); *G06K 9/4628* (2013.01); *G06K 9/6273* (2013.01); *G06N 3/0454* (2013.01); *G06N 3/084* (2013.01); *G06N 5/046* (2013.01); *G06N 20/10* (2019.01); *G06T 7/11* (2017.01); *G06T 2207/10024* (2013.01); *G06T 2207/10052* (2013.01); *G06T 2207/10056* (2013.01); *G06T 2207/10064* (2013.01);
(Continued)

(58) Field of Classification Search
USPC ....... 382/100, 103, 128–134, 156, 162, 168, 382/173, 181, 190, 194, 209, 220, 224, 382/254, 260, 274, 286–291, 305, 318; 250/461.2
See application file for complete search history.

(56) References Cited

U.S. PATENT DOCUMENTS

| | | | |
|---|---|---|---|
| 2018/0018553 A1* | 1/2018 | Bach | G06K 9/6247 |
| 2018/0061058 A1* | 3/2018 | Xu | G06T 7/0012 |

(Continued)

FOREIGN PATENT DOCUMENTS

JP 2012208106 A 10/2012

OTHER PUBLICATIONS

J. Long et al., "Fully convolutional networks for semantic segmentation," In Proc. of IEEE Computer Vision and Pattern Recognition, 2015, URL: https: //people.eecs.berkeley.edu.

(Continued)

*Primary Examiner* — Seyed H Azarian
(74) *Attorney, Agent, or Firm* — Cantor Colburn LLP (57) ABSTRACT

Image processing apparatus 1 includes a hardware processor that acquires a bright-field image of a cell and a fluorescence image in which fluorescent spots of a fluorescent reagent applied dropwise to a region including the cell are imaged, and that uses a convolutional neural network to extract respective image features of the bright-field image and the fluorescence image and to output classification information concerning the cell.

21 Claims, 8 Drawing Sheets

(51) Int. Cl.
*G06K 9/46* (2006.01)
*G06N 3/04* (2006.01)
*G06N 3/08* (2006.01)
*G06N 20/10* (2019.01)
*G06K 9/62* (2006.01)

(52) U.S. Cl.
CPC ............... *G06T 2207/20081* (2013.01); *G06T 2207/20084* (2013.01); *G06T 2207/30024* (2013.01)

(56) References Cited

U.S. PATENT DOCUMENTS

| | | | |
|---|---|---|---|
| 2018/0121760 A1* | 5/2018 | Santamaria-Pang | ......................... G09B 23/303 |
| 2018/0174300 A1* | 6/2018 | Han | ..................... G06T 7/0014 |
| 2018/0232883 A1* | 8/2018 | Sethi | ..................... G06N 3/0454 |

OTHER PUBLICATIONS

M. Zeiler et al., "Adaptive deconvolutional networks for mid and high level feature learning," In Proc. of IEEE International Conference on Computer Vision, 2011, URL: http://www.matthewzeiler.com.

* cited by examiner

IMAGE PROCESSING APPARATUS, IMAGE PROCESSING METHOD, AND COMPUTER-READABLE NON-TRANSITORY RECORDING MEDIUM STORING IMAGE PROCESSING PROGRAM

CROSS REFERENCE TO RELATED APPLICATIONS

The present application claims priority under 35 U.S.C. § 119 to Japanese Patent Application No. 2017-074642, filed on Apr. 4, 2017, the entire content of which is incorporated herein by reference.

BACKGROUND

Technological Field

The present disclosure relates to an image processing apparatus, an image processing method, and a computer-readable non-transitory recording medium storing an image processing program.

Description of Related Art

As molecular targeted therapy centered on therapeutic antibodies has become prevalent in recent years, there is a need for identification of the morphology of cells as observation objects and quantification of biological substances (enzymes, ribosomes, or proteins, for example) inside the cells in order to design molecular targeted drugs more effectively.

As a technique for identifying the morphology of cells as observation objects and quantifying biological substances inside the cells, fluorescence images, which show fluorescent reactions resulted from a fluorescent reagent attached to cells, have been used conventionally.

Patent Literature (PTL) 1 (Japanese Patent Application Laid-Open No. 2012-208106), for example, describes a method for staining a specific antigen in cells using nanoparticles that enclose a fluorescent substance, and for generating information on the specific antigen on the basis of fluorescence signals of the nanoparticles in a fluorescence image. According to the method described in PTL 1, since fluorescence signals are observed as dot-like fluorescent spots, the presence of a specific antigen in the cells can be observed easily and quantified highly accurately.

In actual microscope images of cells, however, a plurality of overlapped cells are observed, or a mixed state with extraneous substances other than cells as observation objects (different type of cells, for example) is observed in some cases. In this regard, the method described in PTL 1 using fluorescence images alone cannot determine, for example, which cells respective fluorescent spots belong to. Accordingly, when the number of fluorescent spots per cell or the distribution of the fluorescent spots inside a cell, for example, is diagnostic information, there is a risk of generating inaccurate diagnostic information, thereby leading to diagnostic errors.

In view of the above, a possible technique is a technique that identifies the morphology of individual cells and/or biological substances inside the cells by using the abovementioned fluorescence images as well as bright-field images taken for the same regions as the fluorescence images, and comparing the fluorescence images and bright-field images.

Figure 1:
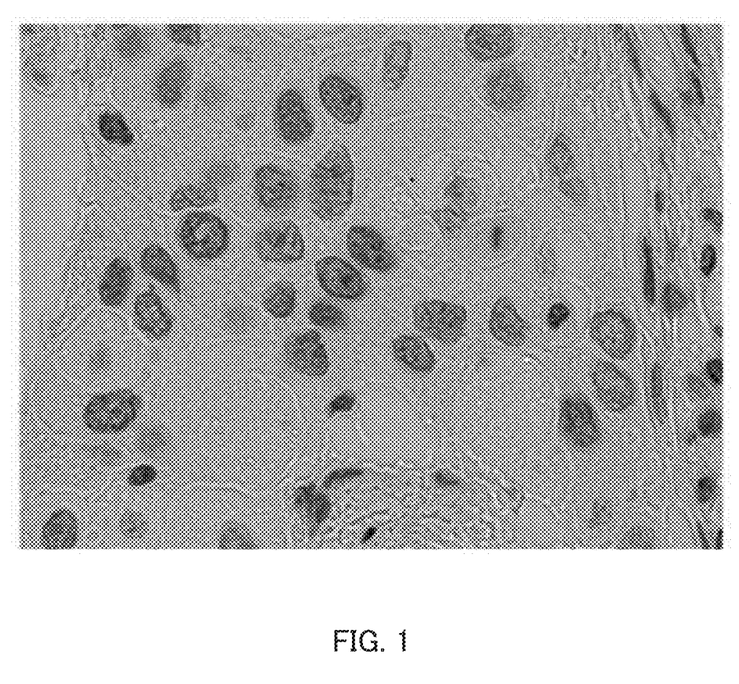
FIG. 1 is an example bright-field image.
Figure 2:
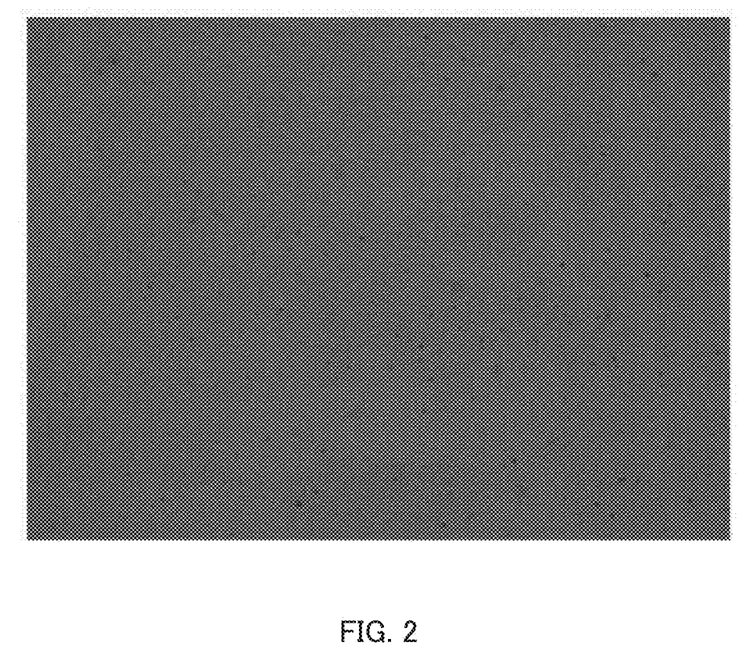
FIG. 2 is an example fluorescence image.

FIG. 1 is an example bright-field image of cells. FIG. 2 is an example fluorescence image of the same region as the bright-field image of FIG. 1.

As in FIG. 1, bright-field images are composed of cells and the background, and are taken so that the morphology of individual cells, for example, is confirmable to some extent.

In contrast, as in FIG. 2, fluorescence images show fluorescent reactions of a fluorescent reagent attached to cells and/or biological substances inside the cells, for example, and thus look like images where only fluorescent spots, which represent fluorescent reactions, are scattered in the nearly entirely black background (in FIG. 2, the original background color has been changed so that the contrast of fluorescent spots to the background is visible). Fluorescent spots appearing in fluorescence images represent fluorescent reactions of a fluorescent substance contained in the fluorescent reagent, and thus indicate the positions where specific cells or biological substances inside the cells are present, the distribution thereof, and the amount thereof, for example.

This means that bright-field images and fluorescence images function complementarily when various details concerning cells in images are identified. Operations of manually comparing bright-field images and fluorescence images, however, are extremely complicated. In view of observing a massive amount of images, there is a need for a technique that can perform such image analysis more easily and highly accurately.

Meanwhile, a convolutional neural network (hereinafter, also referred to as "CNN") has recently been known as an image processing technique that classifies objects in images into categories which the objects belong to and identifies regions occupied by the objects in the images (see, for example, Non-Patent Literature (NPTL 1; J. Long, et al. "Fully convolutional networks for semantic segmentation," in Proc. of IEEE Computer Vision and Pattern Recognition, 2015, URL: https://people.eecs.berkeley.edu/~jonlong/long_shelhamer_fcn.pdf) and NPTL 2 (M. Zeiler, et al. "Adaptive deconvolutional networks for mid and high level feature training," in Proc. of IEEE International Conference on Computer Vision, 2011, URL: http://www.matthew-zeiler.com/pubs/iccv2011/iccv2011.pdf)).

If image analysis including correlations between bright-field images and fluorescence images becomes possible by using such a CNN, easy and highly accurate identification of the type and the morphology of cells, as well as identification of the morphology of biological substances inside the cells and quantification thereof become possible.

SUMMARY

An object of the present disclosure is to provide an image processing apparatus suitable for generating classification information concerning cells in images using a CNN, an image processing method, and a computer-readable non-transitory recording medium storing an image processing program.

Classification subjects of the image processing apparatus of the present disclosure may be various details concerning cells, such as the type, the morphology, or the distribution of cells in images, or the type, the morphology, or the distribution of biological substances inside the cells. Hereinafter, such details will be collectively termed as "classification information concerning cells" and described accordingly.

To achieve at least one of the abovementioned objects, an image processing apparatus reflecting one aspect of the present invention includes a hardware processor that acquires a bright-field image of a cell and a fluorescence image in which fluorescent spots of a fluorescent reagent applied dropwise to a region including the cell are imaged, and that uses a convolutional neural network to extract respective image features of the bright-field image and the fluorescence image and to output classification information concerning the cell, in which the convolutional neural network includes:

a bright-field image processing section that extracts the image feature of the bright-field image by a hierarchically connected first series of feature extraction layers to generate a first feature map group;

a fluorescence image processing section that extracts the image feature of the fluorescence image by a hierarchically connected second series of feature extraction layers to generate a second feature map group;

a concatenation section that concatenates the first feature map group and the second feature map group;

an integrated processing section that extracts, by a hierarchically connected third series of feature extraction layers, an image feature of the first and the second feature map groups concatenated by the concatenation section to generate a third feature map group; and a classification section that generates classification information concerning the cell on the basis of the third feature map group.

Moreover, to achieve at least one of the abovementioned objects, an image processing method reflecting an aspect of the present invention includes:

acquiring a bright-field image of a cell and a fluorescence image in which fluorescent spots of a fluorescent reagent applied dropwise to a region including the cell are imaged; and using a convolutional neural network to extract respective image features of the bright-field image and the fluorescence image and to output classification information concerning the cell, in which the convolutional neural network:

extracts the image feature of the bright-field image by a hierarchically connected first series of feature extraction layers to generate a first feature map group;

extracts the image feature of the fluorescence image by a hierarchically connected second series of feature extraction layers to generate a second feature map group;

concatenates the first feature map group and the second feature map group;

extracts, by a hierarchically connected third series of feature extraction layers, an image feature of the first and the second feature map groups concatenated to generate a third feature map group; and generates classification information concerning the cell on the basis of the third feature map group.

Further, to achieve at least one of the abovementioned objects, a recording medium reflecting an aspect of the present invention causes a computer to perform:

processing for acquiring a bright-field image of a cell and a fluorescence image in which fluorescent spots of a fluorescent reagent applied dropwise to a region including the cell are imaged; and processing for using a convolutional neural network to extract respective image features of the bright-field image and the fluorescence image and to output classification information concerning the cell, in which the convolutional neural network performs:

processing for extracting the image feature of the bright-field image by a hierarchically connected first series of feature extraction layers to generate a first feature map group;

processing for extracting the image feature of the fluorescence image by a hierarchically connected second series of feature extraction layers to generate a second feature map group;

processing for concatenating the first feature map group and the second feature map group;

processing for extracting, by a hierarchically connected third series of feature extraction layers, an image feature of the first and the second feature map groups concatenated to generate a third feature map group; and processing for generating classification information concerning the cell on the basis of the third feature map group.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

(Configuration of Cell Recognition System)

Hereinafter, an example configuration of cell recognition system U which employs image processing apparatus 1 of the present invention will be described with reference to FIG. 3.

Figure 3:
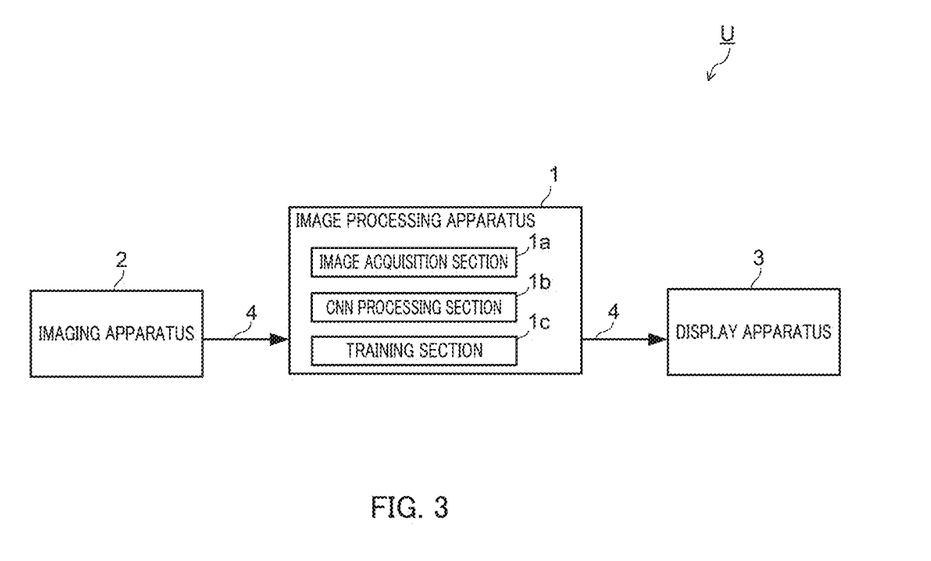
FIG. 3 illustrates an example entire configuration of a cell recognition system of the embodiment.

FIG. 3 illustrates an example entire configuration of cell recognition system U of the embodiment.

Cell recognition system U of the embodiment includes image processing apparatus 1, imaging apparatus 2, and display apparatus 3.

Cell recognition system U of the embodiment images cells in imaging apparatus 2, generates classification information concerning the imaged individual cells in image processing apparatus 1, and displays classification results in display apparatus 3.

Cell recognition system U of the embodiment is configured so that data communication is possible among image processing apparatus 1, imaging apparatus 2, and display apparatus 3 via communication network 4.

Imaging apparatus 2 generates bright-field images of regions where cells are present, and fluorescence images, which are dark-field images of fluorescent reactions upon dropwise application of a fluorescent reagent to the regions.

Imaging apparatus 2 is a commonly-known camera-mounted optical microscope and images cells, which are specimens, mounted on the stage and observed under the microscope. Imaging apparatus 2 performs AD conversion of image signals generated by pickup devices of the camera to generate image data.

Imaging apparatus 2 includes irradiation means, such as a light source and a filter; image forming means, such as an ocular lens and an objective lens; imaging means, such as a charge coupled device (CCD) sensor; and a communication interface; for example.

Imaging apparatus 2 includes a bright-field unit in which irradiation means and image forming means suitable for bright-field observation are combined, as well as a fluorescence unit in which irradiation means and image forming means suitable for dark-field observation are combined. Imaging apparatus 2 is configured, for example, so that bright-field observation and dark-filed observation are switchable. As the fluorescence unit, an excitation light source corresponding to a fluorescent reagent and an optical filter for fluorescence detection, for example, are used.

Bright-field images are microscope images obtained by bright-field magnification and imaging of regions where cells are present, and show the morphology, for example, of the cells. Bright-field images may be images of cell regions stained with a stain reagent (haematoxylin, for example), or may be images of cell regions to which a fluorescent reagent for imaging fluorescence images is applied dropwise.

Fluorescence images are taken by applying a fluorescent reagent dropwise to regions where cells are present and irradiating the regions with excitation light of a specific wavelength so as to image fluorescent reactions of a fluorescent reagent. Fluorescent spots appearing in the fluorescence images represent fluorescent reactions of a fluorescent substance contained in the fluorescent reagent, and indicate the position where specific cells or biological substances in the cells are present, the distribution thereof, and the amount thereof, for example.

Fluorescent reagents may be selected appropriately corresponding to observation objects, i.e., cells or biological substances in the cells, and may be, for example, substances that attach to observation objects, i.e., cells or biological substances in the cells, substances that do not attach only to observation objects, i.e., cells or biological substances in the cells, or substances that undergo chemical reactions or immunoreactions with observation objects, i.e., cells or biological substances in the cells. Such fluorescent reagent includes a substance that, for example, attaches to observation objects, i.e., cells or biological substances in the cells (proteins, nucleic acids, or antigens, for example) and a fluorescent substance (fluorescent organic coloring matter or quantum dots, for example).

Image processing apparatus 1 performs image processing of bright-field images and fluorescence images of the same regions using a convolutional neural network, and outputs classification information concerning cells in the bright-field images and fluorescence images.

Display apparatus 3 is a liquid crystal display, for example, and displays classification information output from image processing apparatus 1.

(Configuration of Image Processing Apparatus)

Hereinafter, an example configuration of image processing apparatus 1 of the embodiment will be described with reference to FIG. 4 to FIG. 8.

Image processing apparatus 1 includes image acquisition section 1a, CNN processing section 1b, and training section 1c.

Image acquisition section 1a acquires image data of bright-field images and fluorescence images of the same regions from imaging apparatus 2.

CNN processing section 1b performs image analysis processing (i.e., forward propagation processing of a convolutional neural network) of the bright-field images and fluorescence images of the same regions using a convolutional neural network to generate classification information concerning cells in the bright-field images or the fluorescence images.

CNN processing section 1b of the embodiment outputs, as classification results, the type of individual cells in the bright-field images and regions where the individual cells are present so as to correspond to respective pixel regions of the images (described hereinafter with reference to FIG. 8). The term "pixel region" herein refers to a region of one pixel, or a region partitioned into a plurality of neighboring pixels. The details of a convolutional neural network employed in CNN processing section 1b of the embodiment will be described hereinafter.

Training section 1c performs training processing of a convolutional neural network, which CNN processing section 1b refers to.

Figure 4:
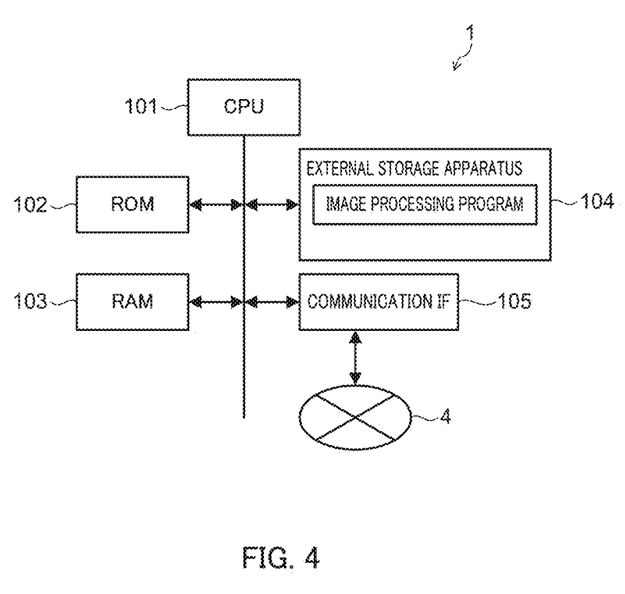
FIG. 4 illustrates an example hardware configuration of an image processing apparatus of the embodiment.

FIG. 4 illustrates an example hardware configuration of image processing apparatus 1 of the embodiment.

Image processing apparatus 1 is a computer equipped with, for example, central processing unit (CPU) 101, read only memory (ROM) 102, random access memory (RAM) 103, external storage apparatus (flush memory, for example) 104, and communication interface 105 as main components.

CPU 101, for example, refers to a control program (image processing program, for example) and/or various data (CNN network structures and trained network parameters, for example) stored in ROM 102, RAM 103, external storage apparatus 104, or the like, thereby realizing each of the above-mentioned functions of image processing apparatus 1. Alternatively or additionally to processing by CPU, processing of a part or all of the functions may be realized by a digital signal processor (DSP). Alternatively or additionally to processing by software, processing of a part or all of the functions may be realized by a dedicated hardware circuit.

[Configuration of Convolutional Neural Network]

Figure 5:
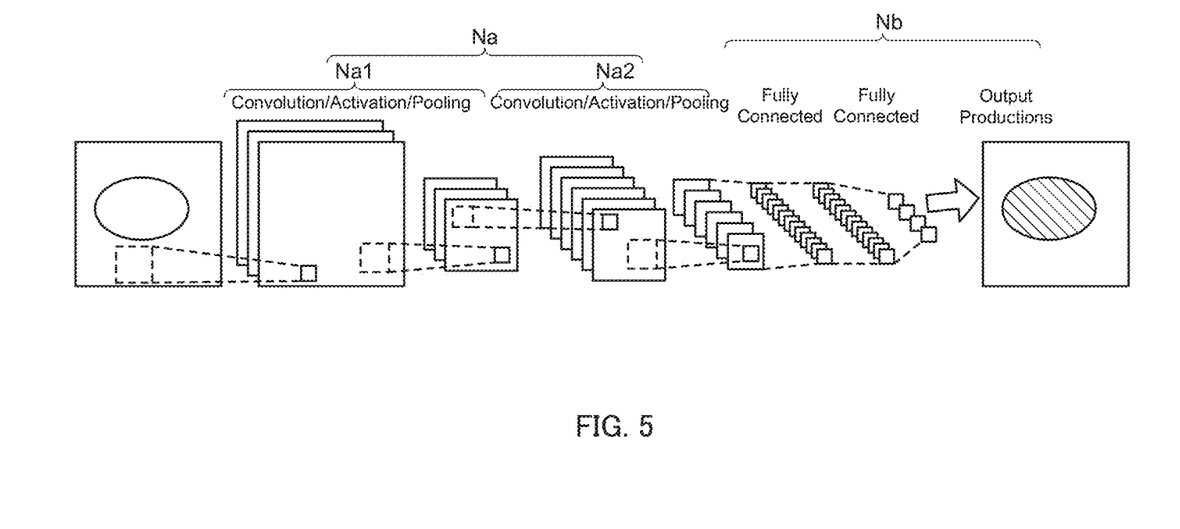
FIG. 5 is a view of a configuration of a common convolutional neural network and illustrates an operation type in a complex operation mode.

First, processing in which image processing apparatus 1 identifies categories of objects using a common convolutional neural network will be described.

FIG. 5 illustrates a configuration of a common convolutional neural network.

The convolutional neural network includes feature extraction section Na and classification section Nb. Feature extraction section Na performs processing for extracting image features from input images, whereas classification section Nb performs processing for classifying objects on the basis of the extracted image features.

Feature extraction section Na is composed of a plurality of hierarchically connected feature extraction layers Na1, Na2 . . . . Each feature extraction layer Na1, Na2 . . . includes a convolution layer, an activation layer, and a pooling layer.

Feature extraction layer Na1, which is the first layer, scans input images for every predetermined size by a raster scanning. Features of input images are extracted by performing feature extraction processing of the scanned data by the convolution layer, the activation layer, and the pooling layer. First feature extraction layer Na1 extracts a relatively simple single feature, such as a horizontal linear feature or a diagonal linear feature.

Feature extraction layer Na2, which is the second layer, scans the images input from the preceding feature extraction layer Na1 (hereinafter, also referred to as "feature maps") for every predetermined size by a raster scanning. Similar to the above, features of the input images are extracted by performing feature extraction processing of the scanned data by the convolution layer, the activation layer, and the pooling layer. Second feature extraction layer Na2 extracts higher-dimension complex features by integrating a plurality of features extracted by first feature extraction layer Na1 while taking account of, for example, positional relationships thereof.

More specifically, each feature extraction layer Na1, Na2 . . . performs the following processing.

The convolution layer performs convolution on each pixel value of the scanned images of predetermined sizes by using feature extraction filters with preset weights (and biases). The convolution layer sequentially performs convolution for every scan and maps the results. The convolution layer performs convolution for each image that is input from the preceding layer by using the feature extraction filter, and adds the results in the corresponding mapping positions, thereby generating a feature map.

The activation layer performs processing that applies a well-known logistic sigmoid function or a rectified linear unit (ReLU), for example, to respective pixel values in pixels of the feature map after convolution.

The pooling layer performs processing that applies a max pooling function or an average pooling function to the feature map output from the activation layer for every predetermined size (every 2×2 pixels, for example).

Each feature extraction layer Na1, Na2 . . . generates feature maps to be output to the following layer through series of processing by the convolution layer, the activation layer, and the pooling layer. Each feature extraction layer Na1, Na2 . . . performs the above processing using feature extraction filters with different weights and generates the same number of feature maps (hereinafter, referred to as "feature map group") as the number of the feature extraction filters.

As described above, feature extraction section Na extracts various high-dimension features of objects in images through repeated feature extraction processing by a plurality of hierarchically connected feature extraction layers Na1, Na2 . . . . Feature extraction section Na outputs a feature map group, which is generated by the final layer among a plurality of feature extraction layers Na1, Na2 . . . , as the final computing results to classification section Nb.

Classification section Nb is composed of, for example, a multilayer perceptron in which a plurality of fully connected layers are hierarchically connected.

Fully connected layers on the input side of classification section Nb fully connect with respective values of the feature maps obtained from feature extraction section Na, perform product-sum operations with different weights on the connected results, and output the operation results. In the fully connected layers on the input side of classification section Nb, elements are provided in the same number as respective values of the feature map group such that the respective values of the feature map group are converted into feature vectors.

The following fully connected layers of classification section Nb fully connect with output values from respective elements of the preceding fully connected layers, and perform product-sum operations with different weights on the connected results. Through the above processing, classification section Nb identifies categories of classification objects in images on the basis of the features obtained from the images.

Classification section Nb performs processing that applies a softmax function, for example, to output values from respective elements of an output layer of the multilayer perceptron, and outputs classification results such that resulting values of product-sum operations become large for the relevant categories among a plurality of categories.

In this step, by providing an element of the output layer of classification section Nb for every pixel region of images, the relevant category among a plurality of categories is output for every pixel region.

The convolutional neural network functions as described above by performing training processing using images with ground truth categories, thereby adjusting network parameters (weights and biases of convolution layers, weights and biases of fully connected layers, for example).

As for common techniques of identifying a category for every pixel region of input images using a convolutional neural network, NPTL1 and NPTL2, for example, are referred to.

Different from the above-mentioned common CNN, image processing apparatus 1 of the embodiment uses both information on bright-field images and fluorescence images complementarily for identifying the type, for example, of cells in the images. Accordingly, image processing apparatus 1 extracts features of cells in bright-field images, features of cells in fluorescence images, and correlations thereof.

Figure 6:
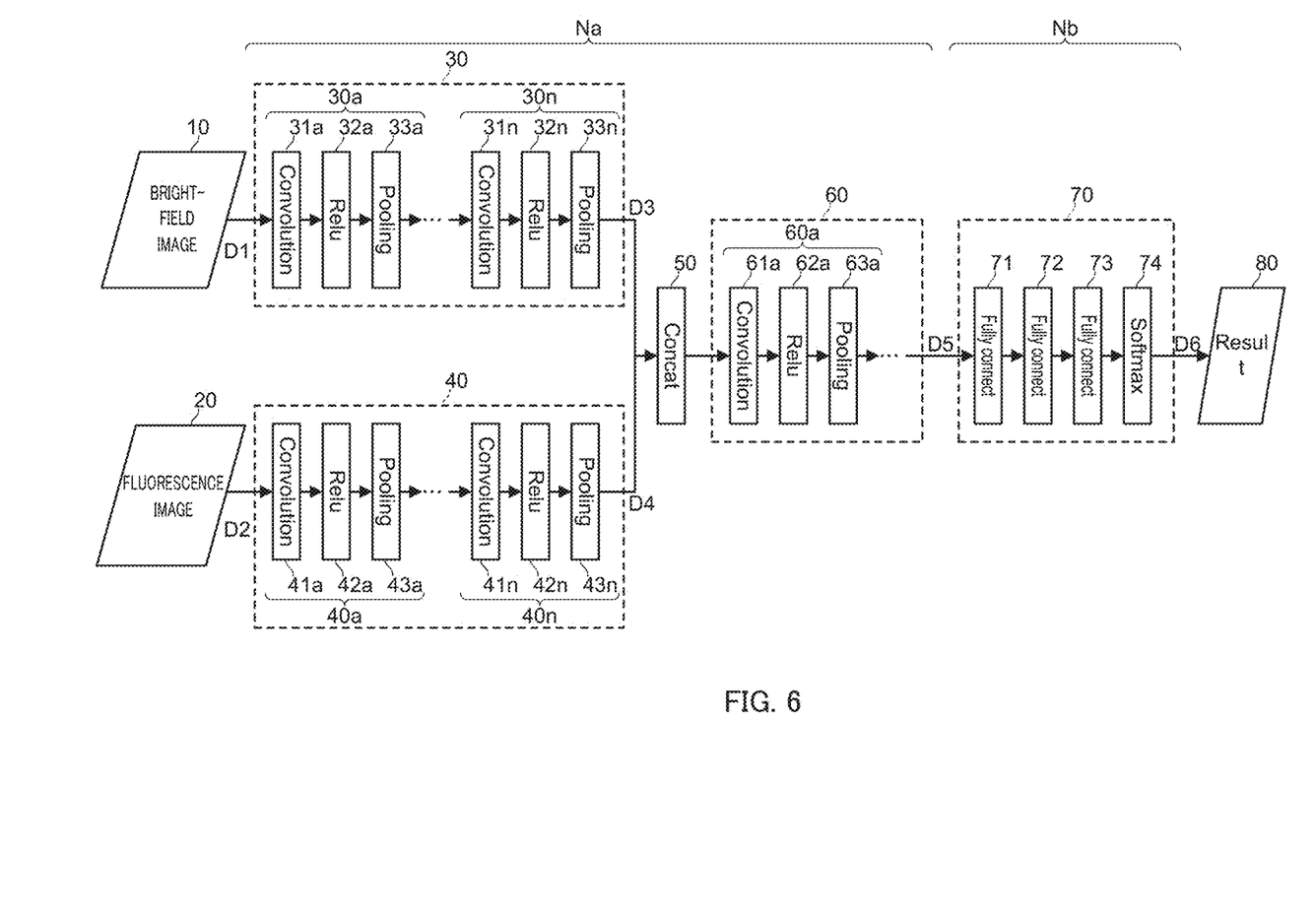
FIG. 6 illustrates an example configuration of a convolutional neural network employed in a CNN processing section of the embodiment.
Figure 7A:
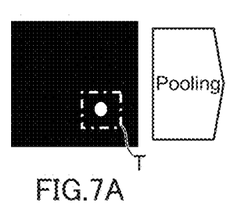
FIG. 7A to FIG. 7D illustrate changes in feature maps as the number of feature extraction layers $40a \ldots 40k$ increases.
Figure 7B:
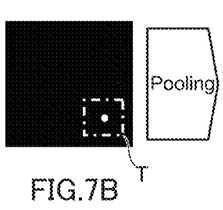
Figure 7C:
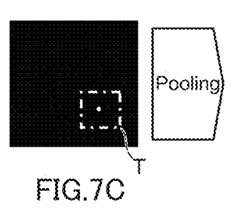
Figure 7D:
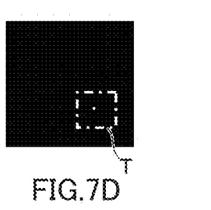

FIG. 6 illustrates an example configuration of a convolutional neural network employed in CNN processing section 1*b* of the embodiment.

The convolutional neural network of the embodiment includes bright-field image input section 10, fluorescence image input section 20, bright-field image processing section 30, fluorescence image processing section 40, concatenation section 50, integrated processing section 60, classification section 70, and output section 80.

In the convolutional neural network of the embodiment, bright-field image processing section 30, fluorescence image processing section 40, concatenation section 50, and integrated processing section 60 constitute feature extraction section Na, whereas classification section 70 constitutes classification section Nb.

Network parameters (weights, biases) of bright-field image processing section 30, fluorescence image processing section 40, integrated processing section 60, and classification section 70, for example, of the convolutional neural network undergo training processing in advance by training section 1*c* such that classification information, such as the state of cells, is output on the basis of the bright-field images and the fluorescence images.

[Bright-Field Image Input Section]

Bright-field image input section 10 acquires data D1 of bright-field images (hereinafter, referred to as "bright-field images D1") and outputs bright-field images D1 to bright-field image processing section 30.

Bright-field image input section 10 performs pretreatment of bright-field images D1, such as decomposition into a RGB 3-channel color space, and then outputs the pretreated bright-field images D1 to bright-field image processing section 30.

[Fluorescence Image Input Section]

Fluorescence image input section 20 acquires data D2 of fluorescence images (hereinafter, referred to as "fluorescence image D2"), and outputs fluorescence image D2 to fluorescence image processing section 40.

In this step, fluorescence image input section 20 acquires fluorescence images of the same regions as bright-field images. Fluorescence image input section 20 preferably uses fluorescence images taken under the same conditions in terms of imaging points and enlarged sizes as the bright-field images. Bright-field images and fluorescence images may be different in imaging positions and/or enlarged sizes provided that correlations between the images are identifiable by providing marks, for example, in cell regions as imaging objects.

Fluorescence image input section 20 may output fluorescence images D2 to fluorescence image processing section 40 after performing pretreatment of fluorescence images D2, such as binarization.

[Bright-Field Image Processing Section]

Bright-field image processing section 30 generates a plurality of feature map data D3 (hereinafter, also referred to as "first feature map group D3") in which image features of bright-field images D1 have been extracted by hierarchically connected feature extraction layers (hereinafter, also referred to as a "first series of feature extraction layers"), and then outputs first feature map group D3 to concatenation section 50.

Bright-field image processing section 30 has a similar configuration to a common CNN described with reference to FIG. 5, and is composed of a plurality of hierarchically connected feature extraction layers 30a . . . 30n (n represents an optional number of layers). Bright-field image processing section 30 performs feature extraction processing, such as convolution, of input data from the preceding layer by each feature extraction layer 30a . . . 30n, and outputs feature maps to the following layer.

Each feature extraction layer 30a . . . 30n includes convolution layer 31a . . . 31n (represented as Convolution in FIG. 6), activation layer 31a . . . 32n (represented as Relu in FIG. 6), and pooling layer 33a . . . 33n (represented as Pooling in FIG. 6). Since processing performed by convolution layers 31a . . . 31n, activation layers 32a . . . 32n, and pooling layers 33a . . . 33n is similar to the processing described with reference to FIG. 5, the description will be omitted here (the same also applies to convolution layers 41a . . . 41k, activation layers 42a . . . 42k, pooling layers 43a . . . 43k, convolution layers 61a . . . , activation layers 62a . . . , and pooling layers 63a . . . ).

In bright-field image processing section 30, the number of feature extraction layers 30a . . . 30n, and/or the number of feature extraction filters set in respective feature extraction layers 30a . . . 30n are appropriately set corresponding to classification subjects (the type, the morphology, or the distribution of cells in images, or the type, the morphology, or the distribution of biological substances in the cells). These numbers are preferably set so that regions where individual cells are present are identifiable at least from the bright-field images.

Bright-filed image processing section 30 thus extracts higher-dimension features of bright-field images from a plurality of viewpoints (edges, regions, distribution, for example) through repeated processing of a plurality of hierarchical feature extraction layers 30a . . . 30n, and outputs the results (first feature map group D3) to concatenation section 50.

[Fluorescence Image Processing Section]

Fluorescence image processing section 40 generates a plurality of feature map data D4 (hereinafter, also referred to as "second feature map group D4") in which image features of fluorescence images D2 are extracted by hierarchically connected feature extraction layers 40a . . . 40k (hereinafter, also referred to as a "second series of feature extraction layers"), and outputs the second feature map group D4 to concatenation section 50.

Fluorescence image processing section 40 has a similar configuration to a common CNN described with reference to FIG. 5, and is composed of a plurality of hierarchically connected feature extraction layers 40a . . . 40k (representing an optional number of layers). Fluorescence image processing section 40 performs feature extraction processing, such as convolution, of input data from the preceding layer in respective feature extraction layers 40a . . . 40k, and then outputs feature maps to the following layer.

Similar to a common CNN described with reference to FIG. 5, each feature extraction layer 40a . . . 40k includes convolution layer 41a . . . 41k, activation layer 42a . . . 42k, and pooling layer 43a . . . 43k.

Fluorescence image processing section 40 thus extracts high-dimension features of fluorescence images from a plurality of viewpoints (edges, regions, distribution, for example) through repeated processing of a plurality of hierarchical feature extraction layers 40a . . . 40k, and outputs the results (second feature map group D4) to concatenation section 50.

In fluorescence image processing section 40, the number of feature extraction layers 40a . . . 40k and/or the number of feature extraction filters set in respective feature extraction layer 40a . . . 40k are appropriately set corresponding to classification subjects (the type, the morphology, or the distribution of cells in images, or the type, the morphology, or the distribution of biological substances in the cells). These numbers are preferably set so that the aggregation state of fluorescent spots is identifiable at least from the fluorescence images.

The number of feature extraction layers 40a . . . 40k of fluorescence image processing section 40 of the embodiment is set so as to become smaller than the number of feature extraction layers 30a . . . 30n of bright-field image processing section 30 in view of general image characteristics of fluorescence images.

Hereinafter, a method for setting the number of feature extraction layers 40a . . . 40k of fluorescence image processing section 40 will be described.

FIGS. 7A to 7D illustrate changes in feature maps as the number of feature extraction layers 40a . . . 40k increases. FIG. 7A to FIG. 7D show in this order the sizes of fluorescent spots T in the feature maps as pooling is repeated.

As described above, fluorescence image processing section 40 of the embodiment performs pooling in each feature extraction layer 40a . . . 40k. Pooling is processing that compresses a pixel region of a predetermined size (2×2 pixels, for example) into one pixel. Through such processing, a CNN generally ensures robustness to changes in, for example, positions and rotation of objects in images. When pooling is repeated by excessive feature extraction layers 40a . . . 40k, fluorescent spots in the feature maps of the fluorescence images may be gradually compressed in size and disappear when being output to concatenation section 50.

In view of the above, the number of feature extraction layers 40a . . . 40k of fluorescence image processing section 40 of the embodiment is set on the basis of image characteristics of fluorescence images (typical size of fluorescent spots in this case) so that the size of fluorescent spots does not become equal to or smaller than one pixel in second feature map group D4, which is output to concatenation section 50.

A typical size of fluorescent spots in fluorescence images is generally constant corresponding to the type of cells, the type of fluorescent reagents, and the enlarged size during imaging, for example, and thus the number of feature extraction layers 40a . . . 40k may be set on the basis of an average size of fluorescent spots, for example, which is calculated by referring to a plurality of fluorescence images.

The number of feature extraction layers 40a . . . 40k of fluorescence image processing section 40 is more preferably set on the basis of image characteristics of fluorescence images (typical distribution of fluorescent spots in this case) so that a proportion of regions where fluorescent spots occupy in the entire images in second feature map group D4, which is output to concatenation section 50, does not become equal to or higher than a predetermined value (30% or higher in the entire feature maps, for example). Such setting is performed because if a proportion of fluorescent spots in input fluorescence images is high, image regions where fluorescent spots occupy in the entire images of second feature map group D4 become excessively large, and thus processing in a later stage becomes impossible.

[Concatenation Section]

Concatenation section 50 concatenates first feature map group D3 generated by bright-field image processing section 30 and second feature map group D4 generated by fluorescence image processing section 40, and outputs the concatenated results to integrated processing section 60.

Concatenation section 50 concatenates, for example, first feature map group D3 of the bright-field images and second feature map group D4 of the fluorescence images as different channels. For example, suppose that the number of the feature maps of first feature map group D3 is 100 and the number of the feature maps of second feature map group D4 is 150, concatenation section 50 concatenates these feature maps to create 250 feature maps. Through processing of concatenation section 50, first feature map group D3 and second feature map group D4 are correlated with each other in every pixel region.

More preferably, concatenation section 50 matches image sizes of first feature map group D3 and second feature map group D4, and then outputs the matched results to integrated processing section 60 in a later stage. As described above, bright-field image processing section 30 and fluorescence image processing section 40 are different in the number of feature extraction layers, and consequently the image size of first feature map group D3 and the image size of second feature map group are different. If the sizes are not matched, there is a risk of failure in which integrated processing section 60 in a later stage cannot correlate first feature map group D3 to second feature map group D4 and vice versa in every pixel region.

In view of the above, concatenation section 50 matches image sizes of first feature map group D3 and second feature map group D4 by upscaling the image sizes of first feature map group D3 to the image sizes of second feature map group D4 using deconvolution or bilinear interpolation, for example. Through such matching, first feature map group D3 and second feature map group D4 are correlated in every pixel region, thereby enhancing accuracy in processing in a later stage.

[Integrated Processing Section]

Integrated processing section 60 acquires first feature map group D3 and second feature map group D4, which are output from concatenation section 50, and performs feature extraction processing again by hierarchically connected feature extraction layers 60 . . . (hereinafter, also referred to as a "third series of feature extraction layers"). Integrated processing section 60 then generates a plurality of feature map data D5 (hereinafter, also referred to as "third feature map group D5") and outputs third feature map group D5 to classification section 70.

Integrated processing section 60 is composed of a plurality of hierarchically connected feature extraction layers 60a . . . (representing an optional number of layers). Each feature extraction layer 60a . . . includes convolution layer 61a . . . , activation layer 62a . . . , and pooling layer 63a . . . . Each feature extraction layer 60a . . . integrally performs feature extraction processing of first feature map group D3 and second feature map group D4 by using both first feature map group D3 and second feature map group D4 as input images.

In integrated processing section 60, the number of feature extraction layers 60a . . . and the number of feature extraction filters set in respective feature extraction layers 60a . . . are appropriately set corresponding to classification subjects (the type, the morphology, the distribution of cells in images, or the type, the morphology, or the distribution of biological substances in the cells). These numbers are preferably set so that at least correlations between features of bright-field images and features of fluorescence images can be extracted.

[Classification Section]

Classification section 70 generates, on the basis of third feature map group D5 output from integrated processing section 60, classification information D6 concerning cells in bright-field images and fluorescence images, and then outputs classification information D6 to output section 80.

Classification section 70 is composed of, for example, hierarchically connected three fully connected layers 71, 72, and 73 (represented as Fully connect in FIG. 6) and output layer 74 (represented as Softmax in FIG. 6).

Classification section 70 of the embodiment has a configuration similar to a configuration of classification section Nb of a common CNN. Fully connected layers 71 on the input side fully connect with respective values (pixel values of respective pixels) of third feature map group D5 acquired from integrated processing section 60, perform product-sum operations with different weights on the connected results, and output the operation results to the following fully connected layers 72. The following fully connected layers 72 fully connect with output values from respective elements of the preceding fully connected layers 71, perform product-sum operations with different weights on the connected results, and output the operation results to the following fully connected layers 73. Further, the following fully connected layers 73 fully connect with output values from respective elements of the preceding fully connected layers 72, perform product-sum operations with different weights on the connected results, and output the operation results to output layer 74.

Fully connected layers 73 on the output side output classification information concerning cells in bright-field images and fluorescence images. Fully connected layers 73 include, for example, an output element in every pixel region and output, for every pixel region, the reliability of the type to which individual cells belong (several tens of categories, such as cell type A, cell type B, cell type C . . . ).

Similar to a common CNN described above with reference to FIG. 5, output layers 74 apply, for example, a softmax function to output values of respective elements of fully connected layers 73 and output classification subjects as probabilities.

The number of fully connected layers 71, 72, and 73 of classification section 70 and/or the number of elements set in fully connected layers 72 and 73 are appropriately set corresponding to classification subjects (the type, the morphology, or the distribution of cells in images, or the type, or the morphology, or the distribution of biological substances of the cells). These numbers are preferably set so that at least boundaries of individual cells (cell walls, for example) are identified, regions where individual cells are present are identified, and overlapped regions are identifiable in regions where a plurality of overlapped cells are imaged.

The configuration of classification section 70 may be changed variously in designing in view of classification subjects and processing load in computing, for example. Classification section 70 may be composed of, for example, a deconvolution section that performs deconvolution instead of the multilayer perceptron (see NPTL1 for details). Alternatively, classification section 70 may be composed of a support vector machine (SVM), for example.

[Output Section]

Output section 80 (represented as Result in FIG. 6) acquires classification information D6 output from output section 70, selects, for example, on the basis of classification information D6, respective categories with the highest probability as the final classification results, and outputs the final classification results. Display apparatus 3 displays the classification results output from output section 80 as classification information concerning cells.

Figure 8:
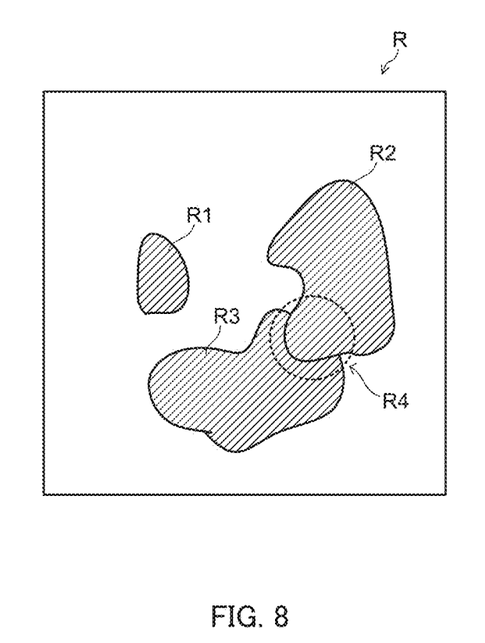
FIG. 8 illustrates an example display mode of classification information concerning cells which is generated by the image processing apparatus of the embodiment.

FIG. 8 illustrates an example display mode of classification information concerning cells, which is generated by image processing apparatus 1 of the embodiment.

In FIG. 8, Region R represents the entire region of a bright-field image. Region R1 represents a region of cell A, region R2 represents a region of cell B, region R3 represents a region of cell C, and region R4 is an overlapped region of cell B and cell C. Regions R1 to R4 are displayed in different colors, for example.

As illustrated in FIG. 8, output section 80 individually identifies a plurality of cells in bright-field image R while identifying a region of each cell (cell A, cell B, and cell C in this case) in every pixel region in the bright-field image, and outputs the results. Output section 80 is configured so that an overlapped region is identifiable in region R4 where a plurality of overlapped cells are imaged. Accordingly, the state of every cell can be classified more clearly.

[Training Section]

The above-described convolutional neural network (bright-field processing section 30, fluorescence image processing section 40, integrated processing section 60, classification section 70) is used after machine learning is performed by training section 1c.

Training section 1c adjusts network parameters (weights, biases, for example) of bright-field image processing section 30, fluorescence image processing section 40, integrated processing section 60, and classification section 70 by using bright-field images and fluorescence images of the same regions, and data associated with ground truth categories thereof as training data, for example.

Training section 1c can perform training processing by adjusting network parameters (weights, biases, for example) of bright-field image processing section 30, fluorescence image processing section 40, integrated processing section 60, and classification section 70 by using bright-field images and fluorescence images of the same regions, and training data associated with ground truth categories thereof such that the loss, which represents an error of output data (output of classification section 70 in this case) regarding the ground truth, becomes small. The loss can be expressed using a softmax cross-entropy function, for example.

Training section 1c may perform the above training processing by using commonly known backpropagation, for example. Training section 1c then stores, in a storage section (external storage apparatus 104, for example), the network parameters adjusted through training processing.

Meanwhile, by using data with a ground truth category in every pixel region for bright-field images and fluorescence images, classification information in every pixel region can be output as illustrated in FIG. 8.

As described above, image processing apparatus 1 of the embodiment can generate various classification information concerning cells by performing processing of a convolutional neural network using bright-field images and fluorescence images of the same cell regions. In particular, the convolutional neural network of the embodiment performs feature extraction processing suitable for respective image characteristics of bright-field images and fluorescence images by bright-filed image processing section 30 and fluorescence image processing section 40, and then integrally performs feature extraction processing in integrated processing section 60. Accordingly, image processing apparatus 1 of the embodiment can classify various states of cells that cannot be classified from either bright-filed images or fluorescence images.

Other Embodiments

The present invention is not limited to the above embodiments, and various modifications are possible.

The configuration of the convolutional neural network of the embodiment is an example, and can be changed variously in designing in view of classification subjects and processing load, for example. For example, feature extraction may be performed in a mode in which feature extraction is performed in every predetermined region and then integrated. Alternatively, feature extraction may further include HOG feature extraction, silhouette extraction, region segmentation, gradient extraction, motion extraction, shape model fitting, or combinations thereof.

The convolutional neural network may be in a mode in which the number of fluorescent spots inside individual cells, for example, is output so that antibody reactions are quantified for every cell.

Although embodiments of the present invention have been described and illustrated in detail, it is clearly understood that the same is by way of illustration and example only and not limitation, the scope of the present invention should be interpreted by terms of the appended claims.

What is claimed is:

1. An image processing apparatus comprising a hardware processor that acquires a bright-field image of a cell and a fluorescence image in which fluorescent spots of the cell stained with a fluorescent reagent are imaged, and that uses a convolutional neural network to extract respective image features of the bright-field image and the fluorescence image and to output classification information concerning the cell, wherein the convolutional neural network includes:
   a bright-field image processing section that extracts the image feature of the bright-field image by a hierarchically connected first series of feature extraction layers to generate a first feature map group;

a fluorescence image processing section that extracts the image feature of the fluorescence image by a hierarchically connected second series of feature extraction layers to generate a second feature map group;
a concatenation section that concatenates the first feature map group and the second feature map group;
an integrated processing section that extracts, by a hierarchically connected third series of feature extraction layers, an image feature of the first and the second feature map groups concatenated by the concatenation section to generate a third feature map group; and
a classification section that generates classification information concerning the cell on the basis of the third feature map group,
wherein the number of the feature extraction layers in the second series is set on the basis of image characteristics of the fluorescence image that are determined on the basis of a type of the cell or the biological substance inside the cell, a type of the fluorescent reagent, and an enlarged size during imaging, and
the number of the feature extraction layers in the second series is set on the basis of a typical size of fluorescent spots as the image characteristics of the fluorescence image such that a size per fluorescent spot in the second feature map group does not become equal to or smaller than a predetermined size.

2. The image processing apparatus according to claim 1, wherein the classification information concerning the cell includes information concerning a type, morphology, or distribution of the cell, or information concerning a type, morphology, or distribution of a biological substance inside the cell.

3. The image processing apparatus according to claim 1, wherein the classification section generates the classification information concerning the cell in association with each pixel region of the bright-field image or the fluorescence image.

4. The image processing apparatus according to claim 1, wherein when a plurality of the cells appear in the bright-field image or the fluorescence image, the classification section generates the classification information concerning the cell for each of the plurality of cells in the bright-field image or the fluorescence image.

5. The image processing apparatus according to claim 1, wherein the concatenation section matches image sizes of the first feature map group and the second feature map group, and concatenates the first feature map group and the second feature map group.

6. The image processing apparatus according to claim 1, wherein the number of the feature extraction layers in the second series is smaller than the number of the feature extraction layers in the first series.

7. The image processing apparatus according to claim 1, wherein the typical size of fluorescent spots as image characteristics of the fluorescent image is an average size of fluorescent spots observed in a plurality of the fluorescence images.

8. The image processing apparatus according to claim 1, wherein the predetermined size is one pixel.

9. The image processing apparatus according to claim 1, wherein the number of the feature extraction layers in the second series is set on the basis of typical distribution of fluorescent spots as image characteristics of the fluorescence image such that a proportion of a region where fluorescent spots occupy in the entire image in the second feature map group does not become equal to or higher than a predetermined value.

10. An image processing method comprising:
acquiring a bright-field image of a cell and a fluorescence image in which fluorescent spots of the cell stained with a fluorescent reagent are imaged; and
using a convolutional neural network to extract respective image features of the bright-field image and the fluorescence image and to output classification information concerning the cell, wherein the convolutional neural network:
extracts the image feature of the bright-field image by a hierarchically connected first series of feature extraction layers to generate a first feature map group;
extracts the image feature of the fluorescence image by a hierarchically connected second series of feature extraction layers to generate a second feature map group;
concatenates the first feature map group and the second feature map group;
extracts, by a hierarchically connected third series of feature extraction layers, an image feature of the first and the second feature map groups concatenated to generate a third feature map group; and
generates classification information concerning the cell on the basis of the third feature map group,
wherein the number of the feature extraction layers in the second series is set on the basis of image characteristics of the fluorescence image that are determined on the basis of a type of the cell or the biological substance inside the cell, a type of the fluorescent reagent, and an enlarged size during imaging, and
the number of the feature extraction layers in the second series is set on the basis of a typical size of fluorescent spots as the image characteristics of the fluorescence image such that a size per fluorescent spot in the second feature map group does not become equal to or smaller than a predetermined size.

11. An image processing apparatus comprising a hardware processor that acquires a bright-field image of a cell and a fluorescence image in which fluorescent spots of the cell stained with a fluorescent reagent are imaged, and that uses a convolutional neural network to extract respective image features of the bright-field image and the fluorescence image and to output classification information concerning the cell, wherein the convolutional neural network includes:
a bright-field image processing section that extracts the image feature of the bright-field image by a hierarchically connected first series of feature extraction layers to generate a first feature map group;
a fluorescence image processing section that extracts the image feature of the fluorescence image by a hierarchically connected second series of feature extraction layers to generate a second feature map group;
a concatenation section that concatenates the first feature map group and the second feature map group;
an integrated processing section that extracts, by a hierarchically connected third series of feature extraction layers, an image feature of the first and the second feature map groups concatenated by the concatenation section to generate a third feature map group; and
a classification section that generates classification information concerning the cell on the basis of the third feature map group,
wherein the number of the feature extraction layers in the second series is set on the basis of typical distribution of fluorescent spots as image characteristics of the fluorescence image such that a proportion of a region where fluorescent spots occupy in the entire image in the second feature map group does not become equal to or higher than a predetermined value.

12. The image processing apparatus according to claim 11, wherein the classification information concerning the cell includes information concerning a type, morphology, or distribution of the cell, or information concerning a type, morphology, or distribution of a biological substance inside the cell.

13. The image processing apparatus according to claim 11, wherein the classification section generates the classification information concerning the cell in association with each pixel region of the bright-field image or the fluorescence image.

14. The image processing apparatus according to claim 11, wherein when a plurality of the cells appear in the bright-field image or the fluorescence image, the classification section generates the classification information concerning the cell for each of the plurality of cells in the bright-field image or the fluorescence image.

15. The image processing apparatus according to claim 11, wherein the concatenation section matches image sizes of the first feature map group and the second feature map group, and concatenates the first feature map group and the second feature map group.

16. The image processing apparatus according to claim 11, wherein the number of the feature extraction layers in the second series is smaller than the number of the feature extraction layers in the first series.

17. The image processing apparatus according to claim 11, wherein the number of the feature extraction layers in the second series is set on the basis of image characteristics of the fluorescence image that are determined on the basis of a type of the cell or the biological substance inside the cell, a type of the fluorescent reagent, and an enlarged size during imaging.

18. The image processing apparatus according to claim 17, wherein the number of the feature extraction layers in the second series is set on the basis of a typical size of fluorescent spots as the image characteristics of the fluorescence image such that a size per fluorescent spot in the second feature map group does not become equal to or smaller than a predetermined size.

19. The image processing apparatus according to claim 18, wherein the typical size of fluorescent spots as image characteristics of the fluorescent image is an average size of fluorescent spots observed in a plurality of the fluorescence images.

20. The image processing apparatus according to claim 18, wherein the predetermined size is one pixel.

21. An image processing method comprising:
acquiring a bright-field image of a cell and a fluorescence image in which fluorescent spots of the cell stained with a fluorescent reagent are imaged; and
using a convolutional neural network to extract respective image features of the bright-field image and the fluorescence image and to output classification information concerning the cell, wherein the convolutional neural network:
extracts the image feature of the bright-field image by a hierarchically connected first series of feature extraction layers to generate a first feature map group;
extracts the image feature of the fluorescence image by a hierarchically connected second series of feature extraction layers to generate a second feature map group;
concatenates the first feature map group and the second feature map group;
extracts, by a hierarchically connected third series of feature extraction layers, an image feature of the first and the second feature map groups concatenated to generate a third feature map group; and
generates classification information concerning the cell on the basis of the third feature map group,
wherein the number of the feature extraction layers in the second series is set on the basis of typical distribution of fluorescent spots as image characteristics of the fluorescence image such that a proportion of a region where fluorescent spots occupy in the entire image in the second feature map group does not become equal to or higher than a predetermined value.

* * * * *